Jan. 20, 1970 R. G. POHOSKI 3,490,593
MULTIPLE VALVED OIL FILTER UNIT
Filed April 28, 1966 4 Sheets-Sheet 1

INVENTOR
Richard G. POHOSKI

ATTORNEY

Jan. 20, 1970    R. G. POHOSKI    3,490,593
MULTIPLE VALVED OIL FILTER UNIT
Filed April 28, 1966    4 Sheets-Sheet 3
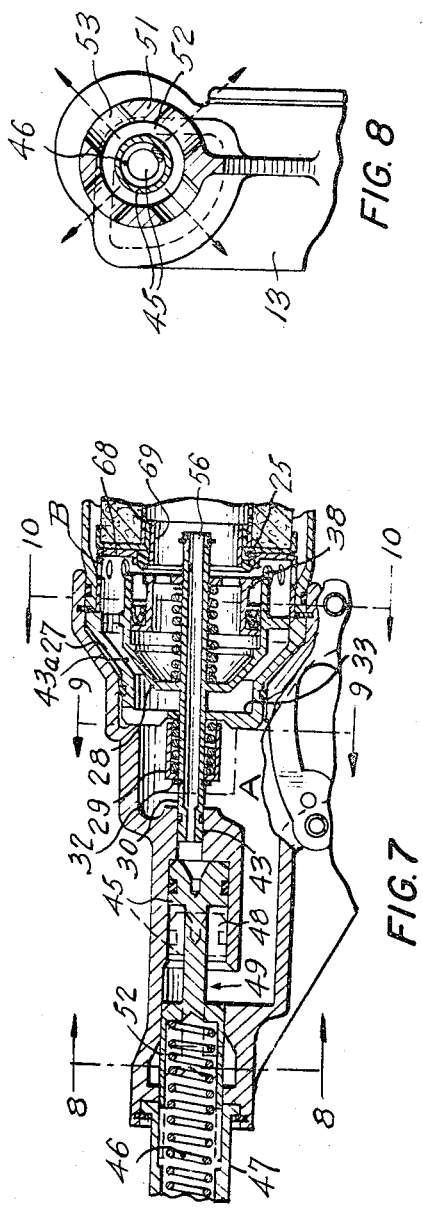
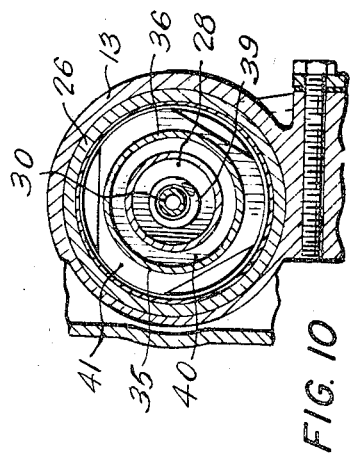
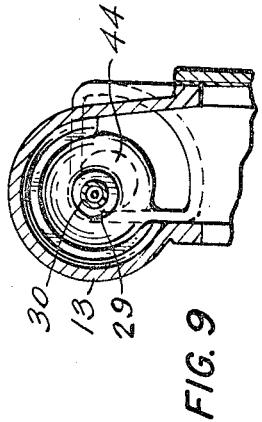
INVENTOR
Richard G. POHOSKI
ATTORNEY Jan. 20, 1970  R. G. POHOSKI  3,490,593
MULTIPLE VALVED OIL FILTER UNIT
Filed April 28, 1966  4 Sheets-Sheet 4
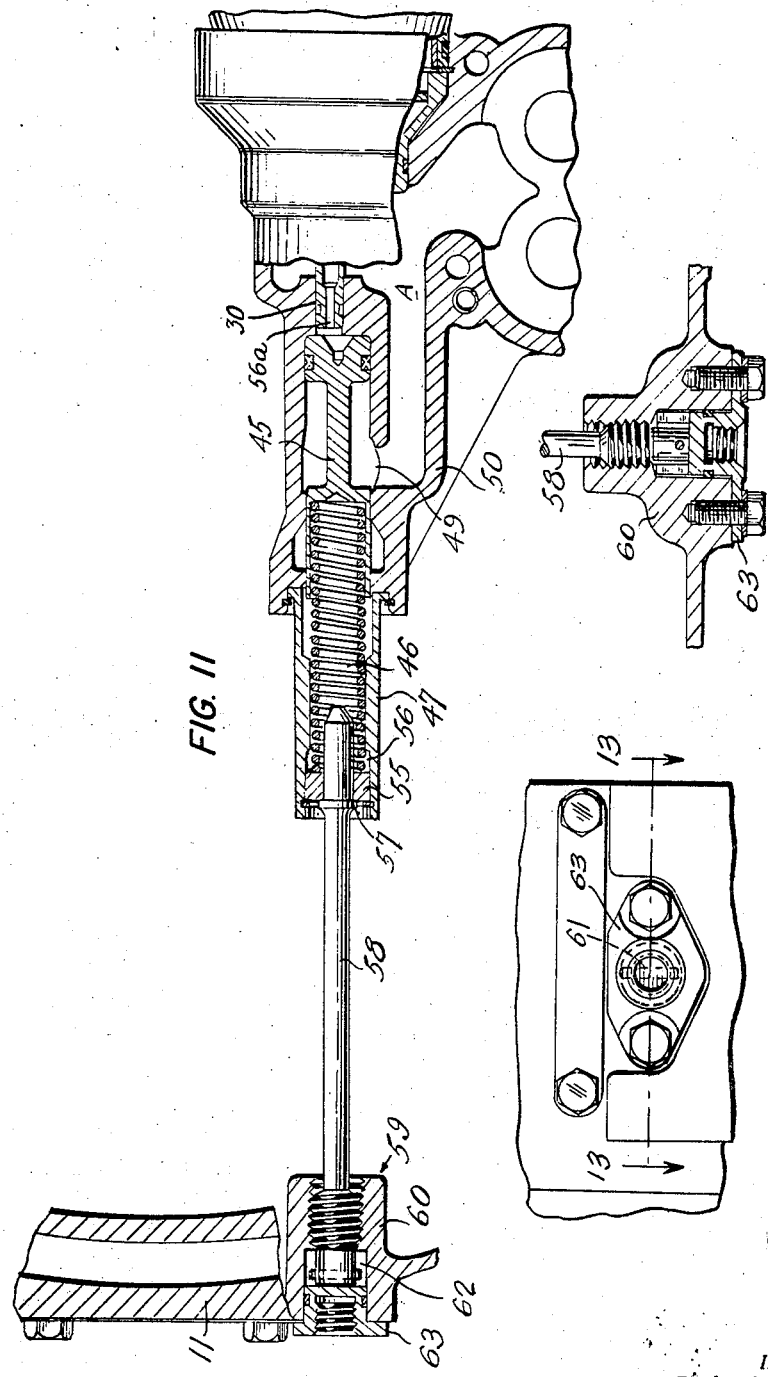
INVENTOR
Richard G. POHOSKI
ATTORNEY United States Patent Office 3,490,593
Patented Jan. 20, 1970

1

3,490,593
MULTIPLE VALVED OIL FILTER UNIT
Richard G. Pohoski, Lafleche, Quebec, Canada, assignor to United Aircraft of Canada Limited, Longueuil, Quebec, Canada
Filed Apr. 28, 1966, Ser. No. 545,912
Int. Cl. B01d 35/14
U.S. Cl. 210—130       13 Claims

ABSTRACT OF THE DISCLOSURE

A compact multiple valve unit to be used in connection with a filter unit comprising a housing having an inlet and an outlet, an inlet chamber, an intermediate chamber, and an outlet chamber, a first inlet valve providing communication between the inlet chamber and the intermediate chamber, a filter located between the intermediate chamber and the outlet chamber whereby fluid normally flows from the intermediate chamber through the filter to the outlet chamber, and a second bypass valve slidingly interconnected with the first valve and operable to provide direct communication between the intermediate chamber and the outlet chamber to bypass the filter when it becomes plugged.

The present invention relates to a multiple valve, and more particularly, to a multiple valve in combination with a filter unit.

The multiple valve and filter unit of the present invention finds particular utility in the filtering of oil, more reliability show to greatest advantage. In aircraft engines in particular, it is necessary to supply filtered oil at a substantially constant pressure. It is conventional to employ a rotary constant displacement pump to supply oil from a sump through a filter. To maintain the pump acting positively, the outlet of the pump communicates particularly in aircraft engines, where compactness and with a valve which opens at a predetermined fluid pressure to deliver oil to the filter unit, the valve acting to maintain a pressure head at the outlet of the pump. The pump is normally operated at a slight excess pressure, and a relief valve is incorporated allowing excess fluid from the pump to return to the sump. It sometimes happens that the filter unit will become blocked with dirt, and since it is of primary importance to supply oil at all times to maintain the power unit in operation, a filter bypass valve is conventionally provided which will allow the oil to bypass the filter in such an event. Due to the minimal amount of space available in aircraft power plants, it is conventional to deploy the various valves and units concerned at parts remote from one another. This raises the cost and difficulty in assembly and maintenance and decreases the reliability of the system as a whole. In accordance with the present invention, a compact multiple valve system has been devised which will allow the necessary valves to be arranged in close proximity in a single unit, and in the preferred case together in a single unit with the filter.

In accordance with one aspect of the present invention, there is provided a multiple valve comprising a hollow housing, a first fluid pressure operated valve mounted in the housing and having a movable member and resilient counter-pressure means acting thereagainst, a second fluid pressure operated valve mounted in the housing and having a movable member and resilient counter-pressure means acting thereagainst, the valves being arranged in alignment so that their movable components are displaceable along a common axis, with said counter-pressure means acting in opposite directions to urge the respective valves closed, inlet means into the

2 housing communicating with the upstream side of said first valve whereby the first valve is openable in response to fluid pressure at the inlet, outlet means out of the housing communicating with the downstream side of said second valve, the housing providing communication between the downstream side of the first valve and the pressure responsive member of the second valve whereby the second valve opens in response to excess fluid pressure on said downstream side.

In accordance with another aspect of the invention, there is provided a multiple valve in combination with a filter unit the combination comprising a housing having an inlet and an outlet and defining a path for fluid flow therebetween, filter means dividing the housing into an outlet chamber communicating with said outlet and an intermediate chamber, a first valve comprising a seat and a movable member and positioned in the path of fluid flow between the inlet and the intermediate chamber, first resilient means arranged to urge the first valve movable member against its seat to close the valve unless the fluid pressure at the inlet exceeds that at the outlet by a first predetermined fluid pressure difference, a filter bypass valve comprising a seat and a movable member and connected between said outlet chamber and said intermediate chamber, second resilient means arranged to urge the bypass valve movable member against its seat to close the valve unless the fluid pressure in the intermediate chamber exceeds that in the outlet chamber by a second predetermined fluid pressure difference greater than said first pressure difference, the first and second resilient means being arranged to act in opposition along a common axis against said first valve movable member.

Having thus generally described the invention, a preferred embodiment is hereafter more particularly described with reference to the accompanying drawings in which:

FIGURE 7 is a view of part of FIGURE 1 on a reduced scale showing both the fluid inlet valve and the filter bypass valve in the open position, the open position of the relief valve being shown in dotted lines;

FIGURE 8 is a section along the line 8—8 of FIGURE 7;

FIGURE 9 is a section along the line 9—9 of FIGURE 7;

FIGURE 10 is a section along the line 10—10 of FIGURE 7;

FIGURE 11 is a view of part of FIGURE 1 on an enlarged scale showing a modification of the spool valve spring adjusting means;

FIGURE 12 is an end elevation of the spring adjusting means of FIGURE 11; and

FIGURE 13 is a section along the line 13—13 of FIGURE 12.

Figure 2:
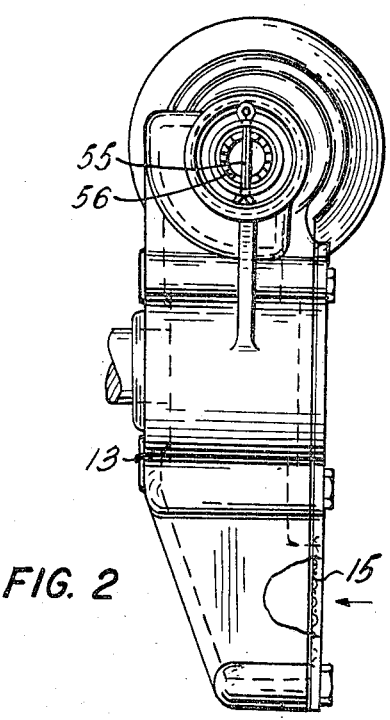
FIGURE 2 is an elevational view of the unit of FIGURE 1 viewed from the lefthand end.

In the drawings there is shown generally designated by the numeral 10 a housing mounted at the right-hand end in the wall of a cylindrical gear box 11 within which is provided an outlet passage 12 for the filtered oil. The central portion of the housing is provided by a casting 13 which also provides the mounting of a rotary, positive displacement gear pump of conventional type, the rotary members of which are not shown. The inlet of the pump is through a chamber 14 of triangular shape disposed near the bottom of the gear box covered by a screen 15 (FIGURE 2). Oil in a sump formed by the bottom of the gear box is sucked by the pump through the screen 15 upwardly through a port 16 at the outlet of the pump into an inlet chamber A of the unit proper.

The right-hand end of the unit is formed substantially from a cylindrical housing portion 18 within which is mounted a filter element 19 by means of two end cups 20′, which hold the annular filter element within the portion 18 leaving an annular space 21 between the filter element and the housing portion 18, which space is closed at the right-hand end of the unit by packing 67 and by an inwardly turned portion of the housing portion 18 at 22, so that oil in the space 21 has to pass through the filter element 19 to reach the space 23 at the axis of the filter, the space 23 communicating via a passage 24 with the outlet passage 12. A perforated support 20 is provided to prevent collapse of the filter element 19.

At the left-hand end, there is provided an annular molded fluorocarbon rubber collar 25 which constitutes a valve seat for the filter bypass valve to be described. The collar abuts the cup 20′ and is held laterally between retainer rings 68 and 69.

Mounted within the pump casting 13 is an annular housing portion 26 formed with a frustoconical shoulder 27 which acts as a seat for a fluid pressure response inlet valve, the movable portion of which is constituted by a frustoconical shoulder 28 adapted to cooperate with the conical shoulder 27 against which it is urged by compression spring 29 to close the inlet valve.

Figure 4:
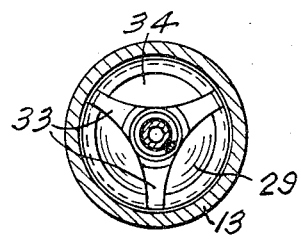
FIGURE 4 is a part section along the line 4—4 of FIGURE 1.

The shoulder 28 is in constant relationship with the cylindrical spring housing 31 which is positioned on cylindrical member 30 by retaining ring 32 and which forms an interconnecting piece between the inlet valve, filter by pass valve, and pressure relief valve as will become apparent. The spring 29 surrounds the cylindrical member 30 and at its left hand end abuts end of spring housing 31. At its right-hand end the spring 29 abuts three transverse ribs 33 (see FIGURE 4) forming part of the member 26 and between which are provided ports 34 which allow oil to pass from the inlet chamber 17 into contact with the shoulder 28 in order to bear against and open the inlet valve.

Also integral with cylindrical member 30 is a hollow cylindrical portion 35. In sliding engagement within the inner surface of the hollow cylindrical portion 35 is a movable annular valve member 3 which forms the movable member of the filter bypass valve. In contact with the inner surface of the hollow cylindrical member 35 is a valve seal 37 which allows the member 36 to move piston-wise within the hollow cylindrical member 35. The right-hand end of the movable annular valve member 36 is formed with a transverse apertured plate 38, which is urged against the enlargement 25 by compression spring 39, which is positioned around the cylindrical member 30 and which abuts at the left-hand end against the shoulder 28 and the right-hand end against the transverse plate 38.

The movable annular valve member 36 together with the enlargement 25 constitute the filter bypass valve. A transverse annular flange 40 on the movable annular valve member 36, and which forms part of the valve seal 37, also acts as a piston. The right-hand, or downstream, facing surface of the flange 40 is exposed to the oil within an intermediate chamber B which is disposed downstream of the fluid inlet valve and upstream of the fluid outlet chamber C. When the filter element 19 becomes clogged, oil will be unable to escape from the space 21, which is in communication with the intermediate chamber B. The fluid pressure will therefore build up in the intermediate chamber B, and when it surpasses a predetermined value, it will act upon the downstream facing surface of the flange 40 forcing the movable annular valve member 36 to the left, thereby opening the filter bypass valve and admitting oil from the intermediate chamber B directing to the outlet chamber C, through the opening thus provided between the plate 38 and the enlargement 25.

Figure 5:
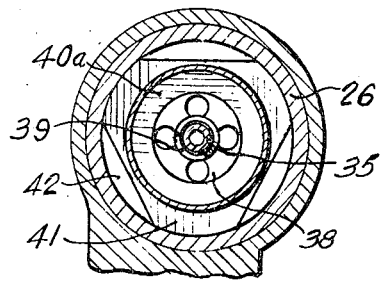
FIGURE 5 is a part section along the line 5—5 of FIGURE 1.
Figure 3:
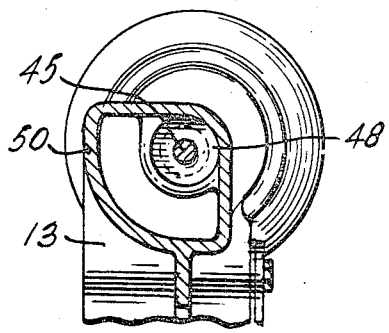
FIGURE 3 is a section along the line 3—3 of FIGURE 1.

Guide flanges 41 are provided between the outer surface of the hollow cylindrical portion 35 and the annular housing member 26 as more clearly shown in FIGURE 5. The flanges 41 do not take the form of a complete annulus but leave peripheral ports 42, and which allow fluid in the inlet chamber A to act against the flange 40 in chamber B to open the bypass valve or to continue its flow through the filter element. The open position of the inlet valve is shown more clearly in FIGURE 7. It will be seen that fluid acting against the shoulder 28 forces the cylindrical member 30 and its associated parts to the right, that is, in the downstream direction, allowing oil to pass through the passage 43a so formed between the cooperating conical shoulders 28 and 27 and into the intermediate chamber B.

FIGURE 7 also shows the open position of the fluid bypass valve. It will be seen that the movable annular valve member 36 has been moved to the left, that is, in the upstream direction, and it will be apparent that the plate 38 is acted upon against the combined resilient return pressure of the springs 29 and 39, or in other words, the spring 39 is precompressed by the opening of the inlet valve and the movable annular valve member 36 must overcome this precompression.

At its left-hand or upstream end, the cylindrical member 30 is slidably mounted within a bore 43 formed within an inwardly extending portion of the casting 13. The bore 43 opens at its upstream end into the end of a spool valve cylinder 44 also formed in the inwardly projecting portion of the casting 13. A spool valve piston 45 is slidably mounted within the cylinder 44 and is urged towards the downstream end of the cylinder 44 by a compression spring 46 maintained within a hollow spring housing 47 at the left-hand end of the casting 13. Means are provided at the left-hand end of the spring housing 47 for adjusting the compression of the spring 46. An annular cavity 48 is provided around the waist of the piston 45 to act as a transfer port. A cylinder 44 is provided with an inlet port 49, and a passage between the inlet chamber A and the port 49 is provided by a part cylindrical wall 50 which surrounds a quadrant of the axis of the unit which is formed by part of the casting 13 shown also in FIGURE 6.

As shown more particularly in FIGURES 7 and 8, the left-hand end portion 51 of the casting 13 which continues the spool valve cylinder 44 is formed with an annular outlet port 52 which communicates with four radial bores 53, which lead to the outside of the housing. When the spool valve is opened, as shown in the dotted lines in FIGURE 7, the piston 45 being moved to the left, the transfer port 48 overlaps ports 49 and 52 allowing fluid under pressure and in the inlet chamber A to pass through the passages 53 and back into the sump.

Figures 1, 6:
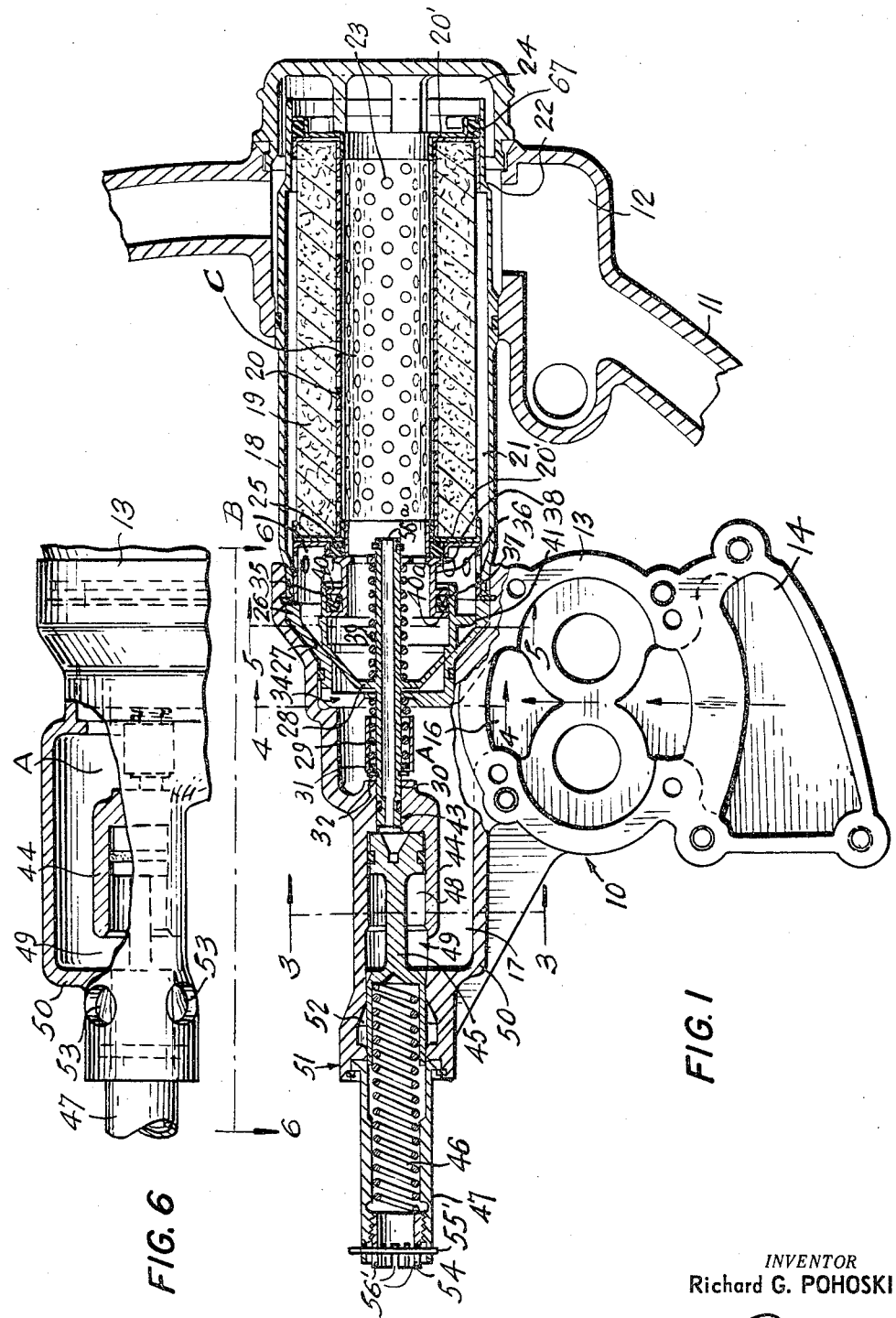
FIGURE 1 is a longitudinal view in axial section through a combination multiple valve and filter unit in accordance with the invention, incorporated within a gear box sump, and showing the arrangement of pump, filter unit, inlet valve, filter bypass valve, and pressure release valve.
FIGURE 6 is a top plan view of part of the unit of FIGURE 1, partly in section, the portion being designated by the line 6—6 of FIGURE 1.

In the arrangement shown in FIGURE 1, the return pressure of the spring 46 is adjusted by means of a screw cap 54 threaded into the end of the spring closure 47 and which may be adjusted by means of a screw driver. A modification of the adjusting means is shown in FIGURES 11, 12 and 13, FIGURE 11 also showing an enlarged view of the spool valve construction. In this embodiment the spring 46 abuts a spacer 55 which is slidable in an enlarged portion 56 of the spring closure 47. The spacer in turn abuts a shoulder 57 of an extension rod 58, which leads to an adjusting mechanism generally indicated at 59 mounted in a side wall of the gear box so as to enable the spring 46 to be adjusted without dismantlement of the gear box. The rod 58 has an enlarged end threadedly mounted in a socket 60 cast into the side wall of the gear box. The rod 58 may be rotated to adjust the spring 46 by means of the slot 61. The end of the rod 58 lies within a recess 62 in the socket 60, the latter being covered normally by a cover plate 63.

The piston 45, in operation, is urged to the left, that is, to the open position by pressure of oil passing through a central bore 56a which passes through the centre of the cylindrical member 30. This happens when the oil pressure in the outlet chamber C exceeds the adjusted force of the return spring 46, the latter being adjusted to the desired oil pressure supplied by the unit. Therefore, the spool valve acts as a pressure relief valve for the pump. When the pressure of delivered filtered oil exceeds that desired and set by the spring 46, the oil passes through the bore 56 a and forces the piston 45 to the left ejecting superfluous oil from the inlet chamber A back into the gear box where it collects in the sump.

Further details of construction are visible in the cross-sections. For example, the holes in the base plate 38 of the bypass valve are visible in FIGURE 5, the purpose of these holes is to allow oil from the outlet chamber C to pass within the hollow cylindrical member 35 so as to act against the upstream facing flange 40A of the movable annular valve member 36. This counteracts the effect of the pressurized oil in the chamber C acting against the downstream face of the plate 38 which would otherwise tend to open the bypass valve under the pressure of oil in the chamber C, which is undesired. Therefore, the bypass valve is substantially balanced with regard to the oil pressure in chamber C and is opened only by oil pressure in the intermediate chamber B acting upon the flange 40. The adjusting means of the embodiment of FIGURE 1 for adjusting the return spring of the spool valve is shown more clearly in FIGURE 2. It will be seen that the spring is retained at the desired setting by a split pin 55' arranged in one of a plurality of slots 56' in the spring closure 47, the pin 55' passing through apertures in the adjusting screw 54.

The operation of the unit may be illustrated by the following example.

Example

The inlet valve spring 29 had the following specifications:

| | |
|---|---|
| Length of spring at start of valve opening inches | .70 |
| Load at start of valve opening lbs | 4.0 |
| Mean diameter inches | .345 |
| Wire diameter do | .040 |
| Free length do | 1.079 |
| Solid height do | 0.446 |
| Compression rate lbs. per inch | 10.55 |

The spool valve spring 46 had the following specifications:

| | |
|---|---|
| Length of spring a start of valve opening inches | 2.35 |
| Load at start of valve opening lbs | 10.8 |
| Mean diameter inches | .426 |
| Wire diameter do | 0.074 |
| Free length do | 2.75 |
| Solid height do | 1.725 |
| Compression rate lbs. per inch | 27.2 |

The filter bypass spring 39 had the following specifications:

| | |
|---|---|
| Length of spring at start of valve opening inches | 1.224 |
| Load at start of valve opening lbs | 7.7 |
| Diameter (outside) inches | .532 |
| Wire diameter do | .062 |
| Compression rate lbs. per inch | 21.6 |

The filter element used was a conventional annular oil filter having a length of about 5¼ inches, an overall diameter of about 2 inches, and an inside diameter of about .850 inch. It was composed of 40 microns glass fibre mat.

The pump used was arranged to supply oil through the unit at a rate of about 190 lbs. per minute which amounted to a delivery velocity of about 11 feet per second, and at a maximum pressure of about 80 lbs. per square inch. When the pressure built up to about 7 lbs. per square inch, the fluid inlet valve or static valve defined by shoulders 27 and 28 started to open. At 10 lbs. per square inch pressure, the fluid inlet valve was fully opened, and oil flowed through the filter with a maximum permissible pressure drop of 20 lbs. per square inch between the outlet chamber C and the intermediate chamber B. The filter bypass valve defined by transfer plate 38 and enlargement 25 was arranged to open at a pressure drop between chamber C and chamber B of 27 lbs. per square inch. When this pressure difference was present, the bypass valve opened allowing oil to pass directly from chamber B to chamber C bypassing the filter.

The spool valve or relief valve was arranged to start opening at a pressure in the inlet chamber A of 55 lbs. per square inch. It will be apparent that the pressure in the inlet chamber A will increase when the engine system has been satisfied. At 70 lbs. per square inch pressure in the inlet chamber A, the spool valve or relief valve was half open, unfiltered oil from the inlet chamber A being forced out of the bores 53 as the outlet of the relief valve and returned to the reservoir in the sump. The relief valve was fully open at a pressure in the inlet chamber A of 80 lbs. per square inch.

It will be apparent that while means are provided for adjusting the relief valve spring to allow variation in the delivery pressure of operation, the springs for the inlet or static valve and the filter bypass valve are not adjustable, and the springs are precalculated before insertion. The resilient return force of these springs is substantially independent of the operating pressure of the delivered oil and is mainly dependent upon the type of filter used.

It will be apparent that the preferred unit constructed in accordance with the invention overcomes many difficulties apparent in the construction of multiple valve units, and a compact unit has been devised which includes three valves which are interrelated one with another and also with a filter pack, the whole having an overall length of only about 1 foot. Within this unit the combination of the filter bypass valve and the fluid inlet valve presents many advantages as a single multiple valve assembly. The construction with the two springs about a single axle member provided by the cylindrical member 30 and with the movable member of the filter bypass sliding within a hollow cylinder integral with the member 35 provides a simple and ingenious integration of two valves with common components. Similarly, the combination of the fluid inlet valve and the spool valve may be considered together as a single entity. In this combination also, the movable members and springs are aligned about a common axis and advantageous integration of the valves is provided by the bore passing centrally through the fluid inlet valve and bringing the outlet chamber C and the piston of the spool valve into direct communication. This gives simplicity of construction which in turn ensures trouble free operation. The provision of a central inlet to the valve system allows further compaction and enables the pump to be mounted directly to the valve and filter assembly.

Many further advantages will be apparent to those skilled in the art from a study of the preferred embodiments herein described and illustrated and which is not intended to be a limitative description of the invention.

I claim:

1. A multiple valve comprising a hollow housing, a first fluid presure operated valve mounted in the housing and having a first movable member and first resilient counter pressure means acting thereagainst, a second fluid pressure operated valve mounted in the housing and having a second movable member and a second resilient counter pressure means acting thereagainst, the valves being arranged in alignment so that their movable components are displaceable along a common axis, with said counter pressure means acting in opposite directions to urge the respective valves closed, and with the second movable member slidably connected to the first movable member, inlet means into the housing communicating with the upstream side of said first valve whereby the first valve is openable in response to fluid pressure at the inlet, outlet means out of the housing communicating with the downstream side of said second valve, the housing constructed to provide fluid communication between the downstream side of the first valve and the upstream side of the second movable member of the second valve whereby the second valve opens in response to excess fluid pressure on its upstream side.

2. A multiple valve in combination with a filter unit, the combination comprising a housing having an inlet and an outlet and defining a path for fluid flow therebetween, filter means dividing the housing into an outlet chamber communicating with said outlet and an intermediate chamber, a first valve comprising a seat and a movable member and positioned in the path of fluid flow between the inlet and the intermediate chamber, first resilient means arranged to urge the first valve movable member against its seat to close the valve unless the fluid pressure at the inlet exceeds that at the outlet by a first predetermined fluid pressure difference, a filter bypass valve comprising a seat and a movable member and connected between said outlet chamber and said intermediate chamber, the bypass valve movable member slidably connected to the first valve movable member, and second resilient means arranged to urge the bypass valve movable member against its seat to close the valve unless the fluid pressure in the intermediate chamber exceeds that in the outlet chamber by a second predetermined fluid pressure difference greater than said first pressure difference.

3. A combination as claimed in claim 2 wherein the housing defines an inlet chamber between the inlet and the first valve, a relief outlet in the housing, a relief valve comprising a seat and a movable member and positioned between the relief outlet and the inlet chamber, and third resilient means arranged to urge the relief valve movable member against its seat to close the valve, and means connecting the outlet chamber with the relief valve whereby when the fluid pressure in the outlet chamber exceeds that at the relief outlet by a third predetermined fluid pressure difference the relief valve opens.

4. A combination as claimed in claim 3 including means for adjusting the third resilient means whereby the said third pressure difference can be set in dependence upon the maximum working pressure of the fluid at the outlet.

5. A combination as claimed in claim 2 wherein said movable member of the first valve includes a first cylindrical member having a pair of spaced transverse annular shoulders intermediate its length, the first and second resilient means comprising a pair of compression springs surrounding said first cylindrical member and abutting respective said shoulders, a cylindrical housing surrounding said first cylindrical member and formed with an abutment for one of said springs, a hollow cylinder integral with the rim of one of said shoulders, spaced inwardly from the housing and surrounding the other of the two compression springs, the bypass valve movable member comprising an annular valve member slidable on said first cylindrical member, abutting the other end of said other spring and in sliding seal engagement with said hollow cylinder and having a transverse annular shoulder facing downstream having regard to the fluid flow path and arranged to act as a piston surface, the first valve seat comprising an annular portion on said cylindrical housing forming an abutment for an outer annular upstream facing surface portion of said hollow cylinder, the second valve seat comprising an annular portion within said cylindrical housing forming an abutment for said movable annular valve member, the fluid inlet into the housing located upstream of the first valve, and the fluid outlet from said housing located downstream of the second valve.

6. A combination as claimed in claim 5 wherein said first cylindrical member is hollow and opens into and slides within an actuator cylinder formed by part of the housing, and further including a spool valve having a piston mounted for sliding within the actuator cylinder coaxially with said first cylindrical member.

7. A combination as claimed in claim 5 wherein the filter means is of annular cross-section extending within said cylindrical housing downstream from said second annular valve seat, the filter means spaced from said cylindrical housing to form an outer chamber, the interior of the filter forming the outlet chamber, the outer chamber communicating with the intermediate chamber, the outlet chamber communicating with said intermediate chamber upon displacement of said second annular movable member from its seat.

8. A multiple valve as claimed in claim 1 wherein the first movable member includes a first cylindrical member having a pair of transverse annular shoulders intermediate its length, the first and second resilient means comprising a pair of compression springs surrounding said first cylindrical member and abutting respective said shoulders, cylindrical housing surrounding said first cylindrical member and formed with an abutment for one of said springs, a hollow cylinder integral with the rim of one of said shoulders, spaced inwardly from the cylindrical housing and surrounding the other of the two compression springs, the second movable member comprising an annular valve member slidable on said first cylindrical member, abutting the other end of said other spring and in sliding seal engagement with said hollow cylinder and having a transverse annular shoulder facing downstream having regard to the fluid flow path and arranged to act as a piston surface, a first annular valve seat on said cylindrical housing forming an abutment for an outer annular upstream facing surface portion of said hollow cylinder, a second annular valve seat within said cylindrical housing forming an abutment for said movable annular valve member, the fluid inlet means into the housing located upstream of the first valve, and the fluid outlet means from said housing located downstream of the second valve.

9. A multiple valve as claimed in claim 8 wherein said first cylindrical member is hollow and opens into and slides within an actuator cylinder formed by part of the housing, and further including a spool valve having a piston mounted for sliding within the actuator cylinder coaxially with said first cylindrical member.

10. A multiple valve comprising a housing defining a cylinder, a pair of adjacent ports in a side wall of the cylinder, a piston slidable in the cylinder, at least one cavity in the side wall of the piston of a length sufficient to overlap both ports, the piston and cylinder constituting a spool valve, resilient means in the cylinder urging the piston towards one end to discommunicate the ports, a cylindrical tube slidably displaceable in the cylinder at said one end with limited axial movement between the end of the cylinder and the piston, an annular shoulder surrounding said tube and integral therewith, means on the housing defining an annular valve seat adapted to engage the spool valve side of the said annular shoulder to form therewith a pressure relief valve, resilient means in the housing arranged to urge said shoulder and said seat in contact to close said valve, fluid inlet means into the housing communicating with the spool valve side of said pressure relief valve, said fluid inlet means also communicating with one of the said pair of adjacent ports in the cylinder side wall, the pressure relief valve being constructed to open at a predetermined fluid pressure to allow inlet fluid to pass therethrough, said cylindrical tube being constructed and arranged to communicate fluid pressure downstream of said pressure relief valve to said spool valve piston, said spool valve piston overcoming the force of its associated resilient means when the downstream fluid pressure reaches a predetermined value, and said spool valve piston thereby moving said spool valve and placing said pair of adjacent ports in communication when said downstream fluid pressure reaches said predetermined value.

11. A multiple valve as claimed in claim 10 wherein said inlet communicates with one of said spool valve ports whereby said excess pressure will open the spool valve to allow escape of inlet fluid therethrough.

12. A combination as claimed in claim 6 wherein the said spool valve includes a pair of adjacent ports in the side wall of the actuator cylinder, one of said ports communicating with said inlet, at least one cavity in the side wall of the piston of a length sufficient to overlap both ports, resilient means in the actuator cylinder urging the piston towards one end to discommunicate the ports, the first cylindrical member providing communication between the outlet chamber and the piston whereby excess pressure in the outlet chamber will displace the spool valve to communicate the ports and to allow the escape of inlet fluid through the ports.

13. A combination as claimed in claim 12 mounted within a gear box housing and further comprising an extension member rotatable at a side wall of the gear box for adjusting a resilient return pressure bearing upon the spool valve piston.

References Cited

UNITED STATES PATENTS

| | | | |
|---|---|---|---|
| 1,874,847 | 8/1932 | Arnold | 210—136 X |
| 2,191,636 | 2/1940 | Walker | 210—130 X |
| 2,349,416 | 5/1944 | Freeman | 210—130 X |
| 2,793,498 | 5/1957 | Banker | 137—115 X |
| 3,042,215 | 7/1962 | Gruner | 210—130 X |
| 3,184,062 | 5/1965 | Humbert | 210—130 |
| 3,235,085 | 2/1966 | Humbert | 210—130 |
| 3,288,299 | 11/1966 | Paton et al. | 210—487 |
| 3,315,809 | 4/1967 | Hultgren | 210—130 |

SAMIH N. ZAHARNA, Primary Examiner

W. S. BRADBURY, Assistant Examiner

U.S. Cl. X.R.

137—110, 512.1; 210—136, 137